Figures 1, 2:
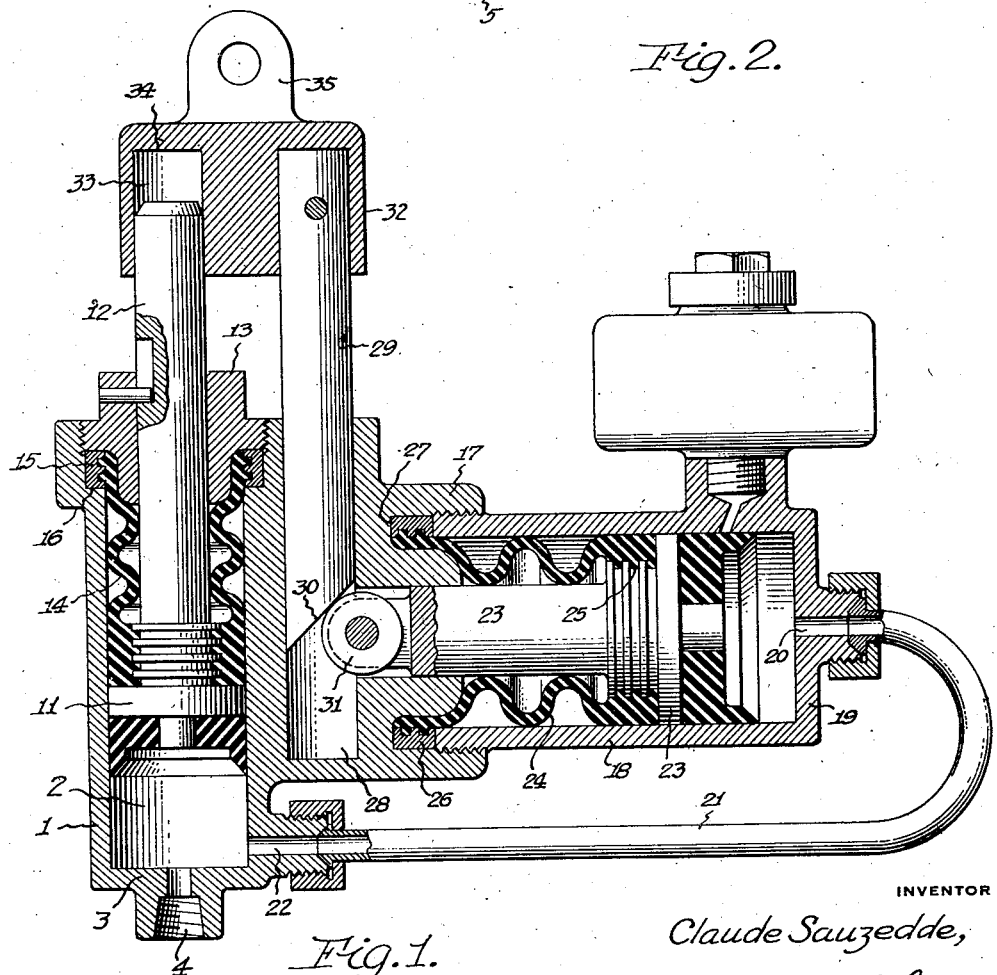

April 16, 1940. C. SAUZEDDE 2,197,012
COMPRESSOR FOR HYDROSTATIC BRAKES
Filed Dec. 30, 1935

INVENTOR
Claude Sauzedde,
BY
ATTORNEYS

Patented Apr. 16, 1940

2,197,012

UNITED STATES PATENT OFFICE 2,197,012

COMPRESSOR FOR HYDROSTATIC BRAKES

Claude Sauzedde, Detroit, Mich., assignor to Detroit Hydrostatic Brake Corporation, Detroit, Mich., a corporation of Michigan Application December 30, 1935, Serial No. 56,598

11 Claims. (Cl. 60—54.6)

The present invention relates to a device for manually applying pressure on fluid in a hydrostatic brake system, for the purpose of applying the brakes of the system.

The primary object of the present invention is to provide for the manual application of hydrostatic brakes with a minimum effort on the part of the operator, and also with a minimum amount of pedal movement. To this end the invention provides a mechanism, commonly known in the hydraulic brake field as a compressor, embodying a low pressure cylinder and a high pressure cylinder, both of which are adapted to be placed in fluid communication with hydrostatically operated brakes when the device is assembled in a brake system. In each of the high and low pressure cylinders is a reciprocating plunger, both plungers being adapted to be actuated by a single foot pedal, so that the movement required of the operator is the same as is customary with conventional brake systems. However, between the brake pedal and the plungers is a connection which provides for movement of the low pressure plunger to such an extent that it causes the clearance between the brake shoes and their drums to be completely taken up prior to actuation of the high pressure plunger. In addition, means is provided whereby the low pressure plunger is mechanically held in a position causing initial or light brake shoe engagement with the brake drums so that no back pressure is transmitted to the brake pedal through this low pressure plunger at the time the high pressure plunger is caused to move, the high pressure plunger being caused to move by a continuation in the movement of the brake pedal, and inasmuch as all clearance has been taken up at the time the high pressure plunger begins to move very little movement of the high pressure plunger is required in order to apply the brakes to their fullest degree.

According to the present invention the low pressure chamber and plunger are preferably of a large diameter, it being possible to form them of a large diameter without incurring excessive back pressure on the pedal because the only resistance to movement of the plunger is that offered by friction and a comparatively small back pressure of the brake shoe retracting springs. The high pressure cylinder and plunger are preferably formed of a comparatively small diameter, it being possible to form them of a small diameter because only a very small fluid movement is required to provide the desired brake actuation after the shoes have been placed in engagement with the drums by the first pressure means. Accordingly it becomes possible to actuate hydraulic brakes with the present brake actuating means by a comparatively small pedal movement, or alternatively to provide a pedal movement to correspond to the movement of conventional brake pedals and to thereby attain a greatly increased mechanical advantage so that the brakes may be applied to their fullest degree with a comparatively small amount of manual pressure on the pedal.

With the above and other ends in view the invention is more fully disclosed with reference to the accompanying drawing, in which Figure 1 is a vertical section of the present actuator, and Fig. 2 is a schematic view illustrating the actuator connected to a pedal and also to a brake.

Like characters of reference are employed to designate corresponding parts throughout.

The numeral 1 designates a body formed with a cylindrical chamber 2 having its end wall 3 provided with a bore 4 which is adapted to be connected into a hydraulic brake system. By way of illustration in Fig. 2 there has been shown a pipe line 5 extending from the bore 4 to chambers 6 having pistons 7 therein. Brake shoes 8 are connected to the pistons 7 and are adapted to engage a brake drum 9. Springs 10 are provided which engage the pistons 7 to normally hold the brake shoes 8 in a retracted position, it being observed that when the shoes are retracted a slight clearance exists between the shoes and the drum 9.

In the cylindrical chamber 2 is provided a plunger 11 having an actuating rod 12 extending through a seal retainer 13 which is screwed into the open end of the chamber 2. In order to prevent leakage of fluid past the plunger 11 the latter is provided with a sealing skirt 14 which is vulcanized to a ring 15 which is in turn clamped between the seal retainer 13 and a shoulder 16 in the body 1.

The body 1 has an annular extension 17 whose axis extends radially with respect to the axis of the chamber 2. The annular extension 17 is internally threaded and receives the end of a cylindrical body 18. The end wall 19 of the cylindrical body 18 has a port 20 connected by a pipe line 21 to a radial port 22 communicating with the chamber 2. In the cylinder 18 is provided a plunger 23 having a sealing skirt 24 vulcanized as at 25 thereto. The end of the skirt 24 is vulcanized to a ring 26 and the latter is interposed between the end of the cylinder 18 and a shoulder 27. Mounted on the end of the plunger 23 is a roller 31 which normally extends into a guide bore 28. Slidably received in the guide bore 28 is a rod 29 having a cam end 30 adapted to strike against the roller 31.

On the outer end of the rod 29 is attached a head 32 having a bore 33 receiving the end of the rod 12, the end of the rod 12 being normally spaced from the bottom 34 of the bore 33. On the head 32 is an ear 35 and a link 36 connects the ear 35 to a brake pedal 37. A spring 38 normally holds the pedal 37 in the position shown in Fig. 2 and it will be understood that the parts are shown in Fig. 1 in a position which corresponds with Fig. 2.

Upon application of manual pressure to the pedal 37 it moves downwardly and causes the link 36 and head 32 to move therewith. As the head 32 moves, the rod 29 carries its cam end 30 into engagement with the roller 31 and thrusts the plunger 23 in a direction toward the right hand side of Fig. 1, wherein the cam surface is illustrated in a position where it has partially moved the plunger 23. Assuming that the cylinder 18 in advance of the plunger 23 is full of liquid, the liquid will be forced through the pipe line 21 into the chamber 2 and from the chamber 2 through the pipe line 5 to the brake cylinders 6. This liquid causes movement of the pistons 7 so that they carry the shoes 8 into light engagement with the brake drum 9. When the rod 29 has been moved a distance which carries the cam surface 30 past the roller 31 the roller rides against the straight side of the rod and has no tendency to move the rod lengthwise. Therefore the back pressure on the fluid in the system caused by the action of springs 10 is not transmitted through the plunger 23 and the rod 29 to the brake pedal. After the cam surface 30 has been moved past the roller 31, the wall 34 in the bottom of the bore 33 will strike the end of the rod 12 so that a continuation in the movement of the pedal 37 will cause the plunger 11 to be moved in the chamber 2. The fluid in the chamber 2, pipe line 5 and cylinders 6 is moved to complete the application of the brake shoes. Inasmuch as the brake shoes 8 are in engagement with the drum 9 at the time the plunger 11 begins to move, very little movement is necessary in the fluid to complete the application and therefore the pedal 37 may be provided with a great leverage advantage.

Although a specific embodiment of the invention has been illustrated and described it will be understood that various changes may be made within the scope of the appended claims without departing from the spirit of the invention and such changes are contemplated.

What I claim is:

1. In combination, an actuator for fluid operated brakes comprising a fluid containing body having two different diameter pistons for applying pressure on the fluid in said body, a rod individual to each piston, one of said rods directly engaging its piston, the other rod having a cam for moving its piston, a pedal, and means between said pedal and said rods connecting the cam bearing rod with the pedal for movement thereby and after movement thereof for connecting the other rod with said pedal for movement thereby.

2. In combination, an actuator for fluid operated brakes comprising a fluid containing body having two different diameter pistons for applying pressure on the fluid in said body, a rod individual to each piston, a pedal, reciprocating means between said pedal and said rods connected to one rod and the pedal for movement thereby and after movement thereof for moving the other rod with said pedal and first rod, and means for locking the first moved piston against retrograde movement during movement of the second moved piston.

3. In combination, an actuator for fluid operated brakes comprising a fluid containing body having two different diameter pistons for applying pressure on the fluid in said body, a rod individual to each piston, a pedal, reciprocating means between said pedal and said rods connected to one rod and the pedal for movement thereby and after movement thereof for moving the other rod with said pedal and first rod, and means on the first named rod for holding the piston moved thereby against retrograde movement during movement of the other piston.

4. In combination, an actuator for fluid operated brakes comprising a fluid containing body having two different diameter pistons for applying pressure on the fluid in said body, a rod individual to each piston, a pedal, and means between said pedal and said rods for connecting one rod with the pedal for movement thereby and after movement thereof for connecting the other rod with said pedal for movement thereby, the first moved rod having a cam for moving its respective piston and a dwell for holding said piston against retrograde movement during movement of the other piston.

5. In combination, an actuator for fluid operated brakes comprising a fluid containing body having two different diameter pistons movable at right angles to each other for applying pressure on the fluid in said body, a pedal, parallel rods connecting said pedal with said pistons, one of said rods having a cam engaging one piston, and a lost-motion device which functions to cause actuation of the cam rod in advance of the other.

6. In combination, an actuator for fluid operated brakes comprising a fluid containing body having two different diameter pistons movable at right angles to each other for applying pressure on the fluid in said body, a pedal, separate means for connecting said pedal with said pistons individually whereby movement of the pedal imparts parallel motion thereto, a lost-motion device which functions to cause actuation of one connecting means in advance of the other, and cam means on one connecting means which functions to move its respective piston and as a lockout device which functions at the completion of the lost motion for holding the first moved piston against retrograde movement.

7. An actuator for fluid operated brakes comprising a fluid containing body having two different diameter pistons for applying pressure on the fluid in said body, a movable element, a rod connected with said movable element and having a cam adapted to move the larger of the two pistons and a dwell adapted to hold the larger piston against retrograde movement, and means connecting said movable element and the smaller piston for moving the latter only when said dwell is active.

8. An actuator for fluid operated brakes comprising a fluid containing body having two different diameter pistons for applying pressure on the fluid in said body, a movable element, a rod connected with said movable element and having a cam adapted to move the larger of the two pistons and a dwell adapted to hold the larger piston against retrograde movement, and a lost-motion device between said movable element and the smaller piston for imparting movement to the latter when the dwell is functioning.

9. An actuator for fluid operated brakes comprising a body for containing fluid, two different diameter pistons in said body for displacing fluid therefrom, a rod individual to said pistons, one of said rods having a cam for actuating its respective piston and the other rod being directly connected to its respective piston, and means between said rods and pedal for causing movement of one rod in advance of the other and in constant parallelism therewith.

10. An actuator for fluid operated brakes comprising a fluid containing body having two different diameter pistons for applying pressure on the fluid in said body, a movable element, a rod connected with said movable element and having a cam adapted to move the larger of the two pistons and a dwell adapted to hold the larger piston against retrograde movement, and a normally loose connection between said movable element and the smaller piston which is made positive for driving the latter upon the initiation and duration of said dwell.

11. In combination, an actuator for fluid operated brakes comprising a fluid containing body having a pair of pistons for applying pressure on the fluid in said body, a rod individual to each piston, one of said rods directly engaging its piston, the other rod having a cam for moving its piston, a pedal, and means between said pedal and said rods connecting the cam bearing rod with the pedal for movement thereby and after movement thereof for connecting the other rod with said pedal for movement thereby.

CLAUDE SAUZEDDE.